United States Patent [19]
Crossfield et al.

[11] Patent Number: 5,459,451
[45] Date of Patent: Oct. 17, 1995

[54] ELECTRONIC ARTICLE SURVEILLANCE SYSTEM WITH ENHANCED GEOMETRIC ARRANGEMENT

[75] Inventors: Michael D. Crossfield; Andrew Dames, both of Cambridge, United Kingdom

[73] Assignee: Esselte Meto International GmbH, Heppenheim, Germany

[21] Appl. No.: 208,881

[22] Filed: Mar. 11, 1994

[30] Foreign Application Priority Data

Mar. 12, 1993 [GB] United Kingdom ............ 9305085

[51] Int. Cl.⁶ .................................................. G08B 13/187
[52] U.S. Cl. .................................... 340/572; 340/551
[58] Field of Search ................................. 340/572, 551

[56] References Cited

U.S. PATENT DOCUMENTS

| | | | |
|---|---|---|---|
| 4,158,434 | 6/1979 | Peterson | 340/572 |
| 4,212,002 | 7/1980 | Williamson | 340/572 |
| 4,260,990 | 4/1981 | Lichtblau | 340/572 |
| 4,373,163 | 2/1983 | Vandebult | 340/572 |
| 4,489,313 | 12/1984 | Pfister | 340/572 |
| 4,572,976 | 2/1986 | Fockens | 307/524 |
| 4,866,424 | 9/1989 | Parks | 340/572 |
| 5,049,856 | 9/1991 | Crossfield | 340/572 |
| 5,061,941 | 10/1991 | Lizzi et al. | 340/572 |
| 5,099,224 | 3/1992 | Santiago et al. | 340/572 |
| 5,103,235 | 4/1992 | Clemens | 340/572 |

FOREIGN PATENT DOCUMENTS

| | | |
|---|---|---|
| 0319637 | 6/1989 | European Pat. Off. . |
| 1267350 | 3/1972 | United Kingdom . |
| 1440398 | 6/1976 | United Kingdom . |
| 2001250 | 1/1979 | United Kingdom . |

*Primary Examiner*—Glen Swann
*Attorney, Agent, or Firm*—Sixbey, Friedman, Leedom & Ferguson

[57] ABSTRACT

An electronic article surveillance system for detecting articles carrying or containing magnetically responsive markers is disclosed, which system comprises a transmitting antenna in the form of a large loop of current-carrying material through which the articles are passed, and one or more receiving antenna units, which detect the electromagnetic response of the markers to an interrogating electromagnetic field generated by the transmitting antenna.

31 Claims, 5 Drawing Sheets

ELECTRONIC ARTICLE SURVEILLANCE SYSTEM WITH ENHANCED GEOMETRIC ARRANGEMENT

BACKGROUND OF THE INVENTION

This invention relates to a system used for detecting a marker within a predetermined zone. The invention is intended primarily for use in the detection of goods in electronic article surveillance or anti-theft systems, but it may be used for example in article tracking or personnel detection systems.

The invention may be used for any type of anti-theft system wherein a magnetic field is set up in a predetermined zone and a specific disturbance magnetic signal is detected, including so-called 'RF' (radio-frequency, generally above 2 MHz) systems, where the disturbance is caused by markers including capacitive/inductive circuits. However, the invention is here illustrated with respect to low-frequency so-called 'EM' (electromagnetic, including electromagnetic harmonics) systems, where the interrogating frequency is generally below 100 kHz, and where the disturbance is caused by markers including a magnetic material with a non-linear magnetic response.

The present invention relates to the physical configuration of the field transmission and reception means, and it allows more efficient use of the magnetic field over a larger volume than hitherto possible. The configuration also allows a high degree of control over the regions where markers can be detected throughout a large volume.

Systems of the prior art have generally used antenna assemblies which are designed to project a magnetic transmission or reception field pattern outside the physical extent of the antenna, so that people and articles move past the assembly or through a zone which lies between two separate assemblies. These assemblies may have transmission and reception means more or less co-located, as in EP 0 134 087, U.S. Pat. No. 4,769,631 and EP 0 352 513. Alternatively, two separate assemblies may be used for transmission and reception respectively, as in U.S. Pat. No. 4,994,939 and EP 0 483 786. In all of these systems, the antenna assemblies are generally flat (i.e. thin, less than about 10 cm thick and usually less that 5 cm thick), panel-like or lattice-like in shape, and with the plane of the panel lying parallel to the direction of passage of the people or goods. In the last two examples cited, the transmitter and receiver enclosures, though separate, are generally very similar in shape and appearance, and are shaped and disposed as described above.

One disadvantage of the prior art systems is that the magnetic field which is experienced by the marker is relatively weak compared with that within or close to the actual antenna assemblies, since it lies some distance outside the antenna. In order to achieve a field sufficient for marker detection, high electrical currents must be passed through the transmission antenna, resulting in the need for costly electronics and heat management systems. Alternatively, the interrogation zone must be very narrow and restricted to the area between the two assemblies: generally less than 1 m wide for "EM" systems or 2 m for "RF" systems (which have more sensitive markers). A second problem, then, is that such systems have not been able to cover very wide passages or exits (e.g. over 2–3 m wide).

Furthermore, the antenna assemblies of known electronic article surveillance systems are generally relatively small, usually being no more than 1–1.5 m tall and 0.5–1 m wide. Due to the small size of the assemblies and their positioning relative to each other, the magnetic field generated in the interrogation zone is non-uniform. This means that the locations of the transmission and reception assemblies must be rigidly specified for the system to operate in a reliable manner. This greatly restricts installation flexibility, since it is rarely possible to adapt a system of this type to an existing store layout; rather, the store layout generally has to be completely redesigned so as to accommodate the electronic article surveillance system. In addition, the volume in which markers are detected in such systems generally extends beyond the volume contained between the transmission and reception assemblies. The installation of such a system consequently results in a reduction of the available retail area since it is not possible to display marked goods near the transmission assembly without setting off an alarm. Moreover, an honest customer who has no intention of shoplifting may accidentally set off the alarm by passing too close to the transmitter assembly, thus leading to embarrassment both for the customer and for the retail store.

Furthermore, recent trends are toward the use of very small markers, which are attractive to the end user but which produce very limited amounts of signal. Because of this, it is very difficult significantly to increase the range of detection of the receiving antennae without swamping the received marker signal in electromagnetic noise generated by the normal environment. Additionally, with an enlarged interrogation zone, it becomes even more important to have some means to limit the overall detection volume in a controllable manner: for example to stop detection in regions which might contain merchandise but which are unavoidably close to the enlarged interrogation zone.

Metal detection systems which utilise a walk-through gate are well-known in connection with airport security systems. These systems generally comprise a single antenna of conducting material through which an alternating current of high magnitude is passed. This sets up an alternating or pulsed magnetic field which induces eddy currents or magnetisation in metal objects which pass through the gate. By their effect on detuning the antenna or on a pulse of magnetic field, the presence of induced eddy currents or magnetisation in nearby metal may be detected. This detection generally takes place by sensing a potential developed across the antenna, or a frequency shift in the antenna resonant frequency; this means that only a single antenna is required for both transmission and detection. These systems, however, allow no discrimination between different ferromagnetic objects, and will give an alarm indication for harmless objects such as belt buckles and key rings as well as for objects such as guns and explosive devices. While such lack of discrimination may be perfectly adequate for use in anti-terrorism applications, where the general public will be prepared to undergo the inconvenience of false alarms, this situation would clearly be unacceptable in electronic article surveillance applications, where a high degree of discrimination is required. Furthermore, in view of the high incidence of false alarms in airport security systems, it is not possible to make the walk-through gate large enough to allow the passage of more than one person at a time, since the alarm would be activated so frequently that it would cause great difficulties for security staff to determine which person was carrying the detected metal article. Because these known walk-through gates only allow the passage of one person at a time, and because of their lack of discrimination, they are completely unsuitable for use in the applications addressed by the present invention.

SUMMARY OF THE INVENTION

According to one aspect of the present invention, there is provided an electronic article surveillance system for detecting articles carrying or containing electromagnetically responsive markers, the system comprising a transmitting antenna in the form of a large loop of current-carrying material which is adapted to generate an interrogating electromagnetic field, and one or more receiving antennae adapted to detect an electromagnetic response of said markers to said interrogating field, characterised in that said one or more receiving antennae are relocatable units located or intended to be located in the vicinity of, but separate from, the transmitting antenna, and which receiving antennae are operable so as selectively to activate predetermined interrogation zones.

In a preferred embodiment of this invention, there is provided a transmitter antenna, configured as a large loop of current-carrying material, which is sufficiently large to allow the passage of objects and personnel through its interior. This means that the transmitter loop is generally larger than in the prior art, and more particularly it lies in a plane which is generally perpendicular to the direction of passage of the markers. The loop may be fabricated from a single current-carrying conductor (such as a copper wire or aluminium tape, or a wider strip fabricated from, for example, a sheet material) which is formed in a single loop generally around the enclosed interrogation area.

Alternatively, for greater mechanical flexibility, the loop may fabricated from one or more conductors which enclose the interrogation volume in several turns. This may be implemented with an existing current-carrying assembly such as standard mains-wiring cable. Spreading out the current-carrying cross-section in this manner has advantages in lowering peak magnetic fields achieved very close to the conductor.

Alternatively, the loop may consist of a single turn of a multi-conductor assembly. The assembly is Joined and terminated by a connector which makes appropriate connections either to form effectively a multi-turn single wire loop or a single turn multi-wire loop (i.e. a plurality of single turn loops), depending on the impedance characteristics required. The advantage of this implementation is that the conductor assembly can be supplied generally in the form of a long roll of material which may be cut to length at the site of installation, fixed in place in a manner similar to a power cable run of conduit, and joined with the termination block. This means that the stocking of exit-size specific components or systems is not required and the transport to and fitting in at the site is relatively simple.

A primary advantage of this loop configuration of the transmission antenna is that it allows, and in fact forces, the goods and people to pass through the plane of the antenna, where the field is strongest. This generally leads to an improvement in the efficiency of magnetic field generation by a factor of around 2 or 3, i.e. for a given input current, the field in (or close to) the antenna plane is around 2 to 3 times stronger than it is away from the planes where interrogation normally takes place in the prior art systems. In practice this means that significantly lower levels of drive current are required in order to achieve a specific level of drive field at the optimum interrogation plane. This eases power supply requirements to the extent that an interrogation area (height of zone multiplied by width of zone) which is approximately 2–6 times larger than in a prior art system can be protected with the present invention, with a similar power supply specification. This has the further advantage that for a given protected area, the present invention gives a much lower farfield induction than the prior art systems. This allows the system more easily to meet magnetic emission regulations. Furthermore, this magnetic field geometry has a much lower effect on other systems (such as cash registers, card readers) which are positioned to the side of the protected area, because the magnetic field is weaker to the side of a coil than to the front or rear of it at an equivalent distance.

An additional advantage of this configuration is that, since the region around the plane of the antenna is used, there is less variation of the transmitted field intensity over the interrogation volume than there is in prior art systems, where the interrogation volume reaches from the plane of the coil to a point quite far distant from the plane of the coil. For a given average of minimum interrogation field intensity, then, the person passing through the system is less likely to be able to experience such high peak field amplitudes in a system according to the present invention than he is in a prior art system. This is important in respect of health concerns or concerns over interference with active electronic devices carried on the person, such as hearing aids, pacemakers and the like.

The provision of receiving antennae in accordance with this aspect of the present invention aims to separate spatially the receiving and transmitting antennae and to allow them to be designed in entirely different forms so that the interrogator system may consist of a transmitter antenna with a variety of receiving antenna assemblies distributed at freely selectable locations around the interrogation zone, and which receiving antennae may be individually operable so as to activate or deactivate predetermined interrogation zones. Such distribution of the receiving means can only operate effectively with a highly spatially uniform transmitter field in the required volume. For example, it is clear from U.S. 4,994,939 that a relatively complex mechanical assembly for fine adjustment and balancing of the receiving antenna with respect to the transmitted field is often required in prior art systems. The receiving means of the present invention have a limited effective range, (for example 50 cm–1 m), but are physically much smaller than the receiving coil means of prior art systems, so they may be positioned at points within the area covered by the interrogation zone without causing excessive obstruction or being visually too obtrusive. In this way, specific volumes within the zone interrogated by the large transmitter means can be selected for active detection by placing a receiving antenna assembly in the vicinity. For example, one side only of the interrogated region (e.g. the region to the inside of the protected location, or to the outside, toward the exit) may be selectively 'activated' for detection. In preferred embodiments, the receiving antennae are provided as self-contained units which may be placed in a required location and wired into the detection system without the need for skilled installation staff.

A further advantage of separating the receiver and transmitter means in this manner is that it makes the overall detectability of markers more uniform (i.e. a lower dynamic range of marker signals is received), since nowhere is the marker very close to both the transmitter and the receiver simultaneously, and the overall received signal is related to the product of the marker's proximity to the transmitter and its proximity to the receiver. A reduced dynamic range of signal has advantages in the reduced complexity of the signal processing and improved success at accurately identifying a signal to be one appropriate to a marker.

The receiving antennae are preferably quadrupole antennae. Quadrupole antennae have balanced positive and negative poles, and are therefore less sensitive to unwanted farfield induction than simple loop antennae. This is because any farfield induction will affect each pole substantially equally, the resultant signal over all poles thereby being relatively negligible.

Advantageous configurations for the receiving antennae include: figure-of-eight, offset figure-of-eight, quadrupole pair, and quadrupole solenoid. In order to compensate for null planes, each receiving antenna preferably includes more than one coil winding. For example, since a figure-of-eight coil has a null plane in the plane of the coil, a receiving antenna may comprise two such coils sharing a longitudinal axis and being generally at right angles to each other so as to provide the best compensation for each other's null planes while aiming to avoid mutual coupling between the coils. Additionally, since figure-of-eight coils have horizontal null planes between the positive and negative poles, it is advantageous for a receiving antenna to include more than one coil type, for example, a figure-of-eight in combination with an offset figure-of-eight and/or a quadrupole pair, in order to provide improved all-round detection.

The turns of the receiving antenna coils are preferably spaced apart by a predetermined degree, for example by being spiral- or helix-wound, since this gives greater sensitivity per inductance than when the coils are simply pile-wound as a tight bundle.

The receiving antennae coils may be disposed on or around the surface of an elongate pole. This may be done either by wrapping the coils around the pole after the coils have been flat-wound, or, in a more flexible embodiment, by winding the coils onto modules which may then be stacked, with the coils connected in various configurations according to the type of receiving antenna required. For example, four modules, each provided with a single coil, may be interconnected to form either a figure-of-eight or an offset figure-of-eight. If the modules are each provided with a parallel pair of coils, then a quadrupole pair antenna can be formed. For enhanced flexibility, each module may be provided with two or more orthogonal pairs of coils, thereby allowing a multichannel receiving antenna to be formed, which antenna comprises a combination of figure-of-eight, offset figure-of-eight and/or quadrupole pair coils, the coils covering each other's null planes in order to provide a multidirectional sensitivity.

Preferably, the receiving antennae are shielded against electrostatic pick-up through the provision of an anti-static cover. This cover may comprise a sleeve or bag formed out of a conductive polymer or a polymer with a metallised, e.g. aluminised, coating on the outside. The cover preferably has a surface resistivity in the range $10^{-2}$ $\Omega$/square to $10^5$ $\Omega$/square inclusive, and is earthed via an earth connector. The cover is preferably separated from the antenna coils by at least 1 mm in order to reduce inductive losses, this spacing being provided by, for example, a foam layer.

In one embodiment of the present invention, the transmitting antenna is a quadrupole antenna in the form of first and second large coaxial loops of current-carrying material spaced apart by a predetermined distance, which loops are adapted to carry current in opposed directions.

The extent of any spurious and unused field from the transmitter may be further limited by the use of such a quadrupole transmitter coil arrangement, i.e. two current carrying loops spaced a small distance apart (generally no greater than half the width of the area enclosed by the loops) and carrying substantially equal currents in opposing directions (this may of course be implemented as a single conductor which is counter-wound in two loops). The loops should be spaced apart along the loop axis. This has the advantage of reducing the farfield magnetic induction at a distance from the transmitter, but allowing a useful field level in two volumes which are equispaced on either side of the system midplane. The second coil need not necessarily be connected to a current source, as it may be a passive closed coil.

A further extension of this aspect of the invention is to use a quadrupole transmitter antenna wherein the two loops carry unequal opposing currents. For example, one loop may carry 40% of the magnitude of the current of the other loop, but in the opposite direction. This has the effect of enlarging one of the two interrogation zones at the expense of the other, i.e., tending to produce a single-sided interrogation system where the active interrogation zone projects on one side of the loop assembly in a manner consistent with the positioning of the receiving assemblies.

According to second aspect of the present invention, there is provided a method of detecting articles containing or carrying electromagnetically responsive markers, comprising the steps of subjecting the markers to an interrogating electromagnetic field generated by means of a transmitting antenna, and observing the electromagnetic response of the markers by means of one or more receiving antenna, characterised in that one or more predetermined regions in the vicinity of said transmitting antenna are selectively activatable to detect said markers by way of the provision of one or more receiving antenna units in said one or more predetermined regions.

Preferably, the transmitting antenna is in the form of a large loop of current-carrying material through which loop the articles are passed.

One possible implementation of the present invention may use a transmitter coil which is energised in a manner described in U.K. Patent Application No. 9302757.1 "Method and System for Detecting a Marker" applied for by the present assignee. In brief, the transmitting antenna is energised with a composite waveform consisting of a low frequency and a high frequency, with detection taking place in a frequency band surrounding the second harmonic of the high frequency. The detected signals are processed by means of a wide-bandwidth detection circuit centred on the second harmonic of the high frequency, with a full time-domain analysis of the received signal shape being carried out, preferably by digital signal processing techniques. This is appropriate to so-called "EM" or non-linear magnetic markers.

BRIEF DESCRIPTION OF THE DRAWINGS

For a better understanding of the present invention, and to show how the same may be carried into effect, reference will now be made, by way of example, to the accompanying drawings, in which.

DETAILED DESCRIPTION OF THE PREFERRED EMBODIMENTS

Figure 1:
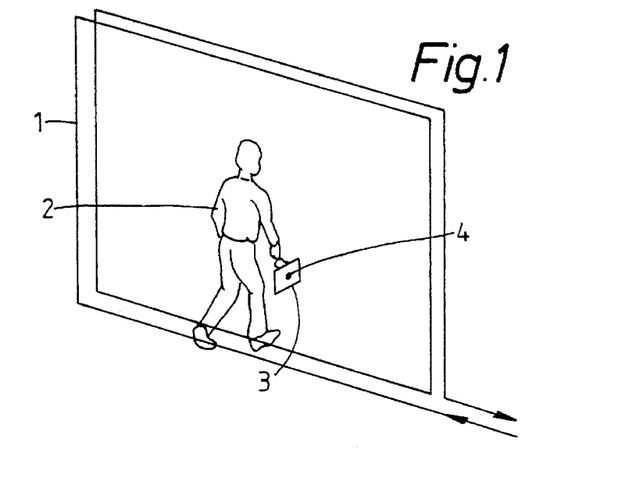
FIG. 1 shows a first embodiment of this invention.
Figure 2:
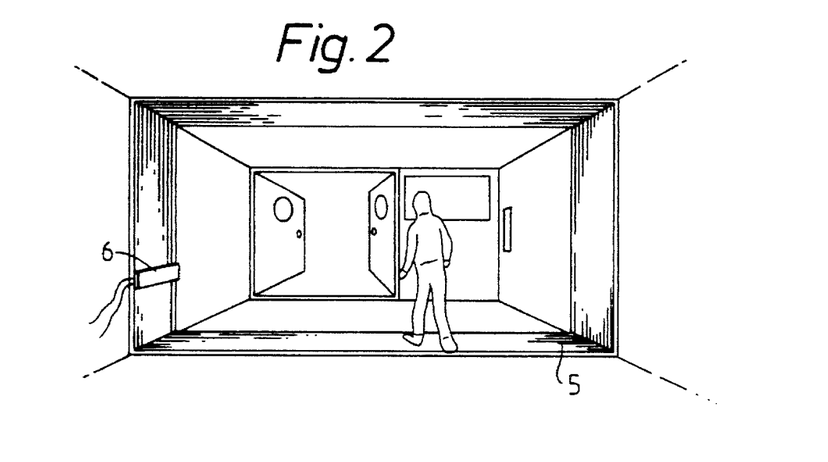
FIG. 2 shows an alternative embodiment of this invention.
Figure 3:
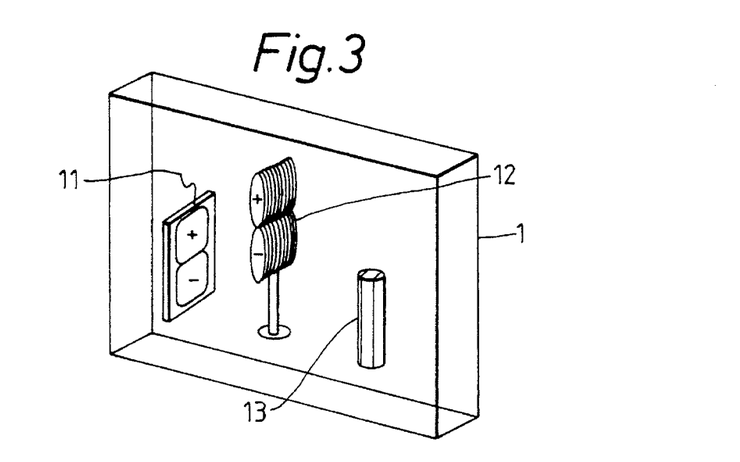
FIG. 3 shows a variety of receiving antennae in relation to a transmitting coil.
Figure 4A:
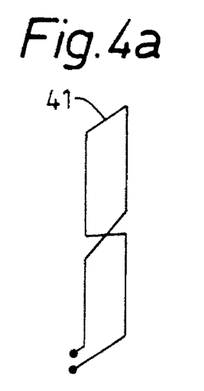
FIG. 4 shows a variety of receiving antenna coil configurations.
Figure 4B:
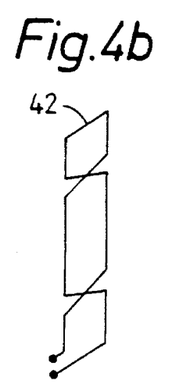
Figure 4C:
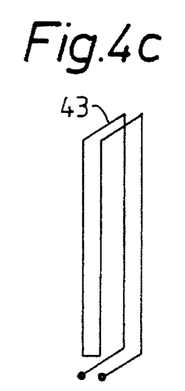
Figure 4D:
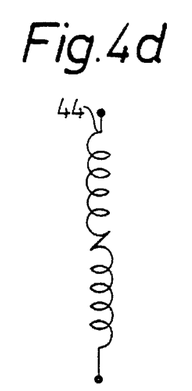

With reference to FIG. 1, there is shown a first embodiment of this invention, which comprises a coil 1 large enough to allow the passage of a person 2 carrying an article 3 containing a magnetically responsive marker 4. An alternative coil arrangement is shown in FIG. 2, in which the transmitting antenna consists of a single turn of a multi-conductor assembly 5. The assembly is Joined and terminated by a connector 6 which makes appropriate connections either to form effectively a multi-turn single wire loop or a single turn multi-wire loop, depending on the impedance characteristics required. FIG. 3 shows three different receiving antennae disposed in the vicinity of the transmitting antenna 1. The receiving antennae are separate physical structures such as a figure-of-eight panel antenna 11, a quadrupole pair 12 of solenoid-type antennae or an antenna pole 13. These antennae may be used individually or in any suitable combination.

Figure 5A:
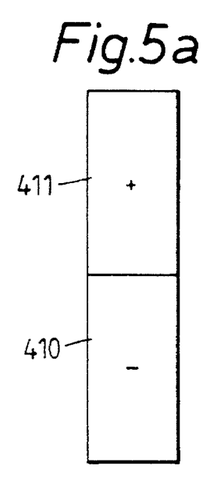
FIG. 5 shows schematically the pole configurations of the coils of FIG. 4.
Figure 5B:
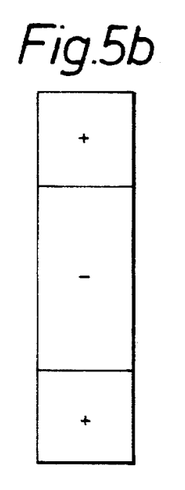
Figure 5C:
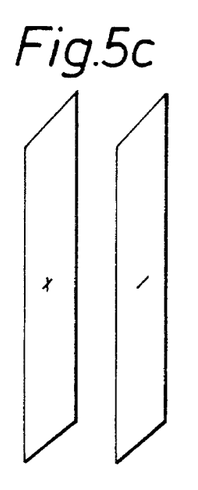
Figure 5D:
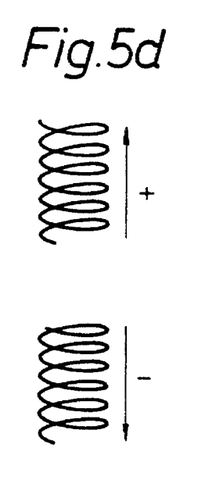

FIGS. 4a to 4d show four different receiving antenna coil configurations, namely: figure-of-eight 41, offset figure-of-eight 42, quadrupole pair 43 and quadrupole solenoid 44. FIG. 5 shows schematically the corresponding pole configurations for the coils of FIG. 4. The poles of figure-of-eight coil 41, as in all suitable quadrupole configurations, are balanced in order to allow rejection of farfield effects, since these are induced substantially equally in each pole. Figure-of-eight coil 41 is, however, slightly unbalanced with respect to the transmitting antenna since the receiving antennae 11 or 13 are generally not as tall as the transmitting coil 1. Although the transmitted field is substantially uniform throughout a large part of the interrogation zone, the flux density is slightly less at the edges of the zone. Accordingly, the lower pole 410 of coil 41 will couple with the transmitted field to a lesser extent than the upper pole 411, leading to a slight imbalance. This may be overcome through the use of an offset figure-of-eight coil 42, in which any imbalance is ameliorated by dividing the poles as shown in FIG. 5b. Quadrupole pair coil 43, by virtue of its pole arrangement shown in FIG. 5c, is balanced with respect to both the transmitted field and any farfield effects, and has no horizontal-plane nulls. This configuration, however, is less sensitive than those shown in FIGS. 5a and 5b, since the quadrupoles are closer together. A quadrupole solenoid configuration 44 has all-round vertical polar sensitivity, but has the disadvantage that the lower pole is sensitive to metal (such as electrical wiring) which may be situated in the floor of the interrogation zone.

Figure 6:
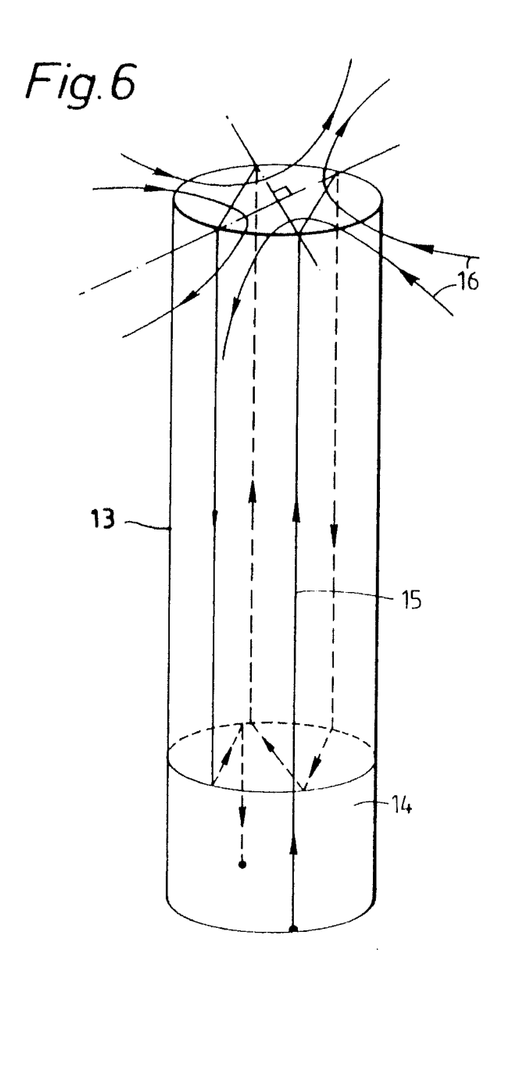
FIG. 6 is a diagrammatic view of a quadrupole pair receiving antenna.

FIG. 6 shows an antenna pole 13 which comprises a pedestal 14 incorporating a coil 15 wound as a quadrupole pair. The directions in which the antenna 13 is sensitive to markers 4 are indicated by the magnetic field lines 16.

Figure 7:
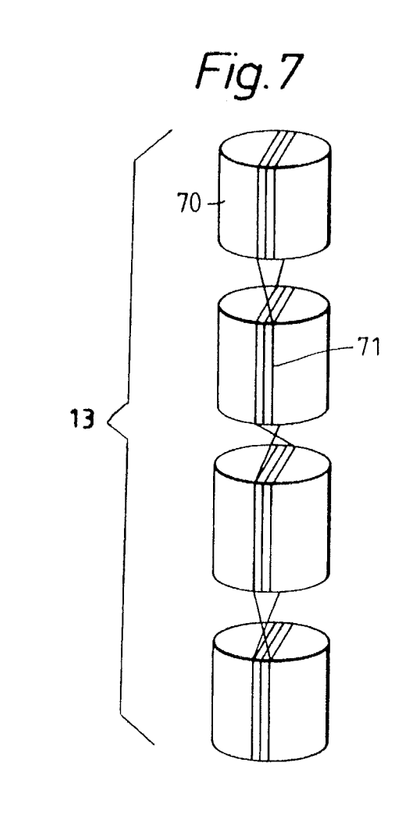
FIG. 7 is an exploded view of a figure-of-eight receiving antenna built up from stackable modules.
Figure 8:
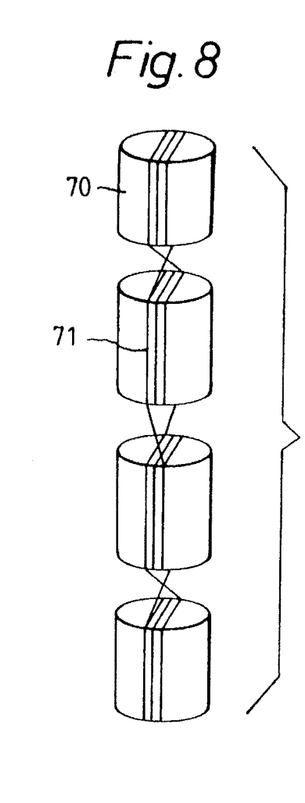
FIG. 8 is an exploded view of an offset figure-of-eight receiving antenna built up from stackable modules.
Figure 9:
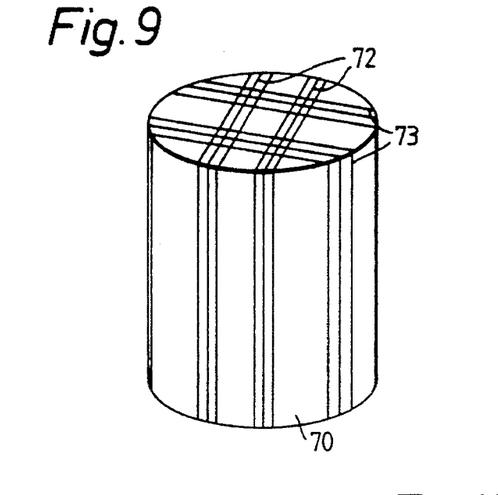
FIG. 9 shows a stackable module with multiple coils windings.

FIG. 7 is an exploded view of a receiving antenna pole 13 comprising four stackable modules 70, each with a single coil winding 71, with the windings 71 being connected to form a figure-of-eight configuration, and FIG. 8 shows the windings 71 arranged to form an offset figure-of-eight. The modules 70 may be made of any suitable non-conducting material. FIG. 9 shows a module 70 with two pairs of orthogonal coil windings 72 and 73 (not conductively linked at cross-over locations), enabling a variety of coils to be configured when a plurality of such modules are stacked. The modules may be glued or bolted together for structural stability.

Figure 10:
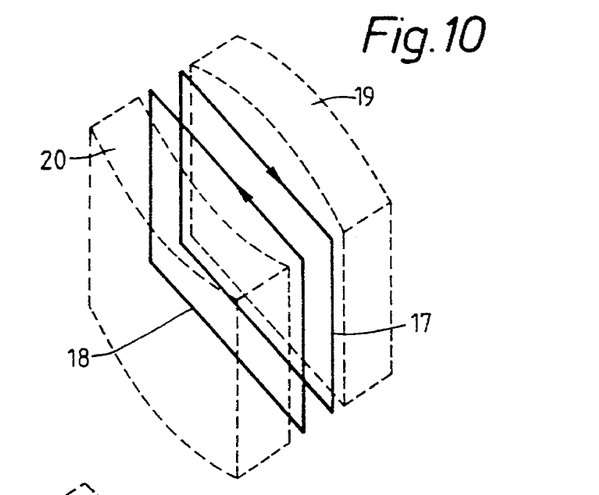
FIG. 10 shows a quadrupole transmitter coil arrangement with equal opposing currents.
Figure 11:
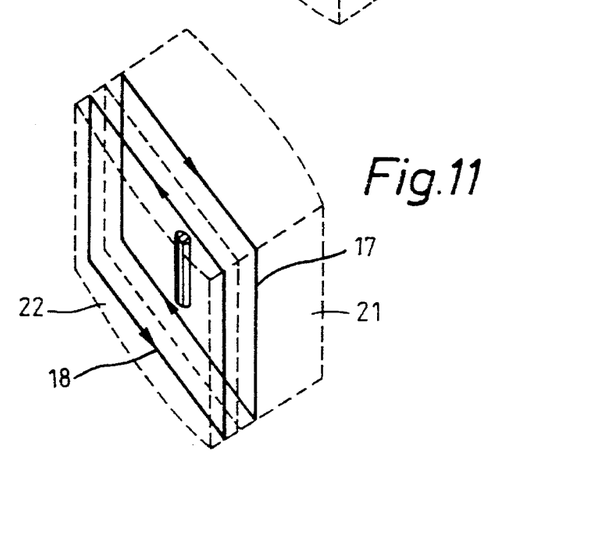
FIG. 11 shows a quadrupole transmitter coil arrangement with unequal opposing currents.

FIGS. 10 and 11 show a quadrupole transmitter coil arrangement comprising first and second current-carrying coils 17 and 18. In FIG. 10, the coils carry current of equal magnitude in opposing directions, thus giving rise to interrogation zones 19, 20 of equal size on either side of the coil arrangement. In FIG. 11, the coils carry current of unequal magnitude in opposing directions, thus giving rise to interrogation zones 21, 22 of proportionately different size on either side of the coil arrangement.

Figure 12:
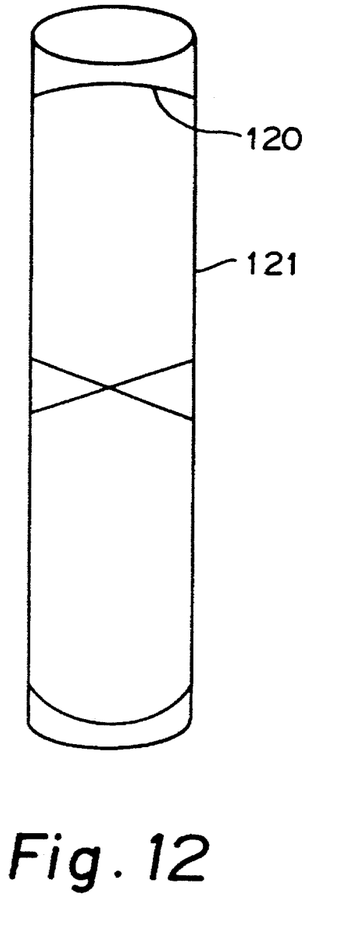
FIG. 12 shows a figure-of-eight coil wrapped around a cylindrical core.
Figure 13:
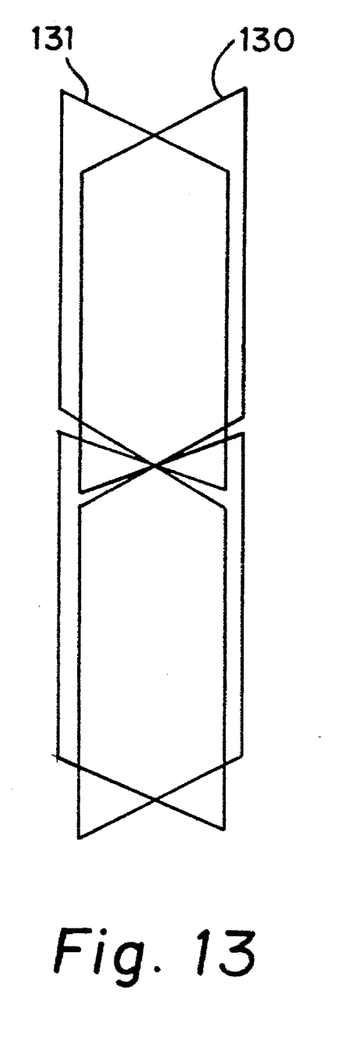
FIG. 13 shows a pair of figure-of-eight coils arranged at right angles to one another.

FIGS. 12 and 13 show a figure-of-eight coil 120 wrapped around a cylindrical core 121 and a pair of figure-of-eight coils 130, 131 disposed generally at right angles to one another, respectively. As previously indicated, the coil configuration of FIG. 12 may be fabricated by wrapping the coil 120 around the core 121 after the coil 120 has been flat-wound, or by winding the coil 120 onto a module.

We claim:

1. An electronic article surveillance system for detecting articles carrying or containing electromagnetically responsive markers, the system comprising a transmitting antenna in the form of a loop of current carrying material large enough to allow the passage of a person through the loop which is adapted to generate an interrogating electromagnetic field, and one or more receiving antennae adapted to detect an electromagnetic response of said markers to said interrogating field, characterised in that said one or more receiving antennae are relocatable units located or intended to be located in the vicinity of, but separate from, the transmitting antenna, and which receiving antennae are operable so as selectively to activate predetermined interrogation zones.

2. A system as claimed in claim 1, wherein said loop is arranged so that said articles are passed through the loop when the system is in operation.

3. A system as claimed in claim 1, wherein said transmitting antenna is disposed so that the plane of said loop is generally perpendicular to the direction of passage of articles through its interior.

4. A system as claimed in claim 1, wherein said loop comprises a single turn of a current-carrying conductor.

5. A system as claimed in claims 4, wherein said conductor comprises a length of multi-conductor ribbon whose ends are joined and terminated by a connector adapted to bring the conductors in one end of said ribbon into electrical contact with the conductors in the other end of said ribbon.

6. A system as claimed in claim 5, wherein the ends of said multi-conductor ribbon are joined in such a way that the ribbon is configured as a multi-turn single wire loop.

7. A system as claimed in claim 5, wherein the ends of said multi-conductor ribbon are Joined in such a way that the ribbon is configured as a plurality of single-turn loops.

8. A system as claimed in claim 1, wherein said loop comprises multiple turns of a current-carrying conductor.

9. A system as claimed claim 1, wherein the width of the area enclosed by said loop is not less than 2 m.

10. A system as claimed in claim 1, wherein the width of the area enclosed by said loop is not less that 3 m.

11. A system as claimed in claim 1, wherein said one or more receiving antennae are quadrupole antennae.

12. A system as claimed in claim 11, wherein at least one of said one or more receiving antennae is a figure-of-eight coil wrapped around a generally cylindrical core.

13. A system as claimed in claim 11, wherein at least one of said one or more receiving antennae is a pair of vertically divided figure-of-eight coils sharing a longitudinal axis and generally at right angles to each other.

14. A system as claimed in claim 11, wherein at least one of said one or more receiving antennae is a figure-of-eight panel antenna.

15. A system as claimed in claim 11, wherein at least one of said one or more receiving antennae is a quadrupole pair antennae.

16. A system as claimed in claim 11, wherein at least one of said one or more receiving antennae is a quadrupole solenoid antenna.

17. A system as claimed in claim 11, wherein at least one of said one or more receiving antennae comprises a plurality of stackable modules, each module comprising one or more coil windings.

18. A system as claimed in claim 11, wherein said one or more receiving antennae is or are located on only one side of said transmitting antenna.

19. A system as claimed in claim 1, wherein said one or more receiving antennae is or are individually operable with respect to another receiving antenna.

20. A system as claimed claim 1, wherein said transmitting antenna further comprises an additional large loop of current-carrying material coaxial with and spaced apart from said loop.

21. A system as claimed in claim 20, wherein said transmitting antenna is a quadrupole antenna in the form of first and second large coaxial loops of current-carrying material spaced apart by a predetermined distance, which loops are adapted to carry current in opposed directions, and through which loops said articles are passed when the system is in operation.

22. A system as claimed in claim 21, wherein said predetermined distance is no greater than half the width of the area enclosed by said loops.

23. A system as claimed in claim 21, wherein the system is configured so that, in use, the magnitude of the current in said first and second loops is substantially the same.

24. A system as claimed in claim 21, wherein the system is configured so that, in use, the magnitude of the current in said first loop is greater than that in said second loop.

25. A system as claimed in claim 21, wherein said second loop is not connected to a current source.

26. A system as claimed in claim 1, wherein said electromagnetically responsive markers include a magnetic material with a non-linear magnetic response, and wherein said interrogating electromagnetic field is an alternating magnetic field with a frequency not greater than 100 kHz.

27. A system as claimed in claim 1, wherein said transmitting antenna is adapted to be assembly in situ.

28. A system as claimed in claim 27, wherein said transmitting antenna is fabricated from electrically conductive cable.

29. A system as claimed in claim 27, wherein said transmitting antenna is fabricated from electrically conductive tape.

30. A method of detecting articles containing or carrying electromagnetically responsive markers, comprising the steps of subjecting the markers to an interrogating electromagnetic field generated by means of a transmitting antenna, and observing the electromagnetic response of the markers by means of one or more receiving antennae, characterised in that one or more predetermined regions in the vicinity of said transmitting antenna are selectively activatable to detect said markers by way of the provision of one or more receiving antennae in said one or more predetermined regions.

31. A method according to claim 30, wherein said transmitting antenna is in the form of a large loop of current-carrying material through which loop said articles are passed.

* * * * *